(12) United States Patent
Hellgren et al.

(10) Patent No.: US 10,574,063 B2
(45) Date of Patent: Feb. 25, 2020

(54) METHOD AND SYSTEM FOR BALANCING A BATTERY PACK

(71) Applicant: VOLVO TRUCK CORPORATION, Göteborg (SE)

(72) Inventors: Jonas Hellgren, Göteborg (SE); Esteban Gelso, Göteborg (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 227 days.

(21) Appl. No.: 15/578,319

(22) PCT Filed: Jul. 14, 2015

(86) PCT No.: PCT/EP2015/066077
§ 371 (c)(1),
(2) Date: Nov. 30, 2017

(87) PCT Pub. No.: WO2017/008846
PCT Pub. Date: Jan. 19, 2017

(65) Prior Publication Data
US 2018/0358819 A1 Dec. 13, 2018

(51) Int. Cl.
*H02J 7/00* (2006.01)
*H02J 7/14* (2006.01)
*B60L 58/22* (2019.01)

(52) U.S. Cl.
CPC .......... *H02J 7/0016* (2013.01); *B60L 58/22* (2019.02); *H02J 7/0021* (2013.01);
(Continued)

(58) Field of Classification Search
USPC ................................. 320/118, 119
See application file for complete search history.

(56) References Cited

U.S. PATENT DOCUMENTS

2006/0181244 A1* 8/2006 Luo .................... H01M 10/441
                                                                320/128
2009/0009133 A1* 1/2009 Tange ............. G01R 19/16542
                                                                320/132
(Continued)

FOREIGN PATENT DOCUMENTS

EP          2787594 A2   10/2014
JP       H11299122 A   10/1999
(Continued)

OTHER PUBLICATIONS

International Search Report (dated Jan. 27, 2016) for corresponding International App. PCT/EP2015/066077.

*Primary Examiner* — Alexis B Pacheco
(74) *Attorney, Agent, or Firm* — Venable LLP; Jeffri A. Kaminski

(57) ABSTRACT

A method is provided for balancing a battery pack including a plurality of battery cells connected in series, wherein each battery cell is associated with a resistor which is connected in parallel with the battery cell and wherein each of the resistors is coupled in series with a controllable switch which is connected to a control unit. The method includes selectively closing and opening the switch so as to initiate discharging of the corresponding battery cell, thereby balancing the battery cell in relation to other cells of the battery pack. Furthermore, the method includes a) defining a control variable indicating, for each switch, an open or closed condition, b) determining a cost based at least on the current losses of the battery pack resulting from the switch being controlled according to the control variable, repeating steps a) and b) a predefined number of times, d) selecting a control variable which results in the cost being minimized, and e) initiating the balancing based on the selected control variable. A system for balancing a battery pack is also provided.

13 Claims, 5 Drawing Sheets

(52) U.S. Cl.
CPC ......... *H02J 7/0047* (2013.01); *B60L 2200/18* (2013.01); *H02J 2007/005* (2013.01); *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 2009/0118947 A1* | 5/2009 | Heap | B60K 6/445 |
| | | | 701/55 |
| 2010/0264878 A1* | 10/2010 | Ueda | H02J 7/0016 |
| | | | 320/116 |
| 2011/0068744 A1 | 3/2011 | Zhu | |
| 2011/0103051 A1 | 8/2011 | Takumi | |
| 2012/0025835 A1 | 2/2012 | Chandler et al. | |
| 2013/0088202 A1 | 4/2013 | Kamata et al. | |
| 2013/0278218 A1 | 10/2013 | Onnerud et al. | |
| 2014/0285151 A1 | 9/2014 | Steck et al. | |

FOREIGN PATENT DOCUMENTS

| | | |
|---|---|---|
| JP | 2009159672 A | 7/2009 |
| JP | 2011072169 A | 4/2011 |

* cited by examiner

METHOD AND SYSTEM FOR BALANCING A BATTERY PACK

BACKGROUND AND SUMMARY

The present invention relates to a method for balancing a battery pack comprising a plurality of battery cells connected in series, wherein each battery cell is associated with a resistor which is connected in parallel with said battery cell and wherein each of said resistors is coupled in series with a controllable switch which is connected to a control unit. The method comprises selectively closing and opening said switch so as to initiate discharging of the corresponding battery cell, thereby balancing said battery cell in relation to other cells of said battery pack.

The invention also relates to a system for balancing a battery pack comprising a plurality of battery cells connected in series, wherein each battery cell is associated with a resistor which is connected in parallel with said battery cell wherein each of said resistors is coupled in series with a controllable switch which is connected to a control unit, said control unit being configured to selectively close and open said switch to initiate discharging of the corresponding battery cell, thereby balancing said battery cell in relation to other cells of said battery pack.

The invention can be applied in vehicles, such as cars, trucks, buses and construction equipment. Although the invention will be described below with respect to an application in the form of a bus, the invention is not restricted to this particular type of vehicle, but may be used in other vehicles.

In the field of vehicles, there is a steady increase in research and development related to propulsion of vehicles with alternative power sources, i.e. power sources being used as alternatives to conventional internal combustion engines. In particular, electrically operated vehicles have emerged as a promising alternative.

According to today's technology, a vehicle can be operated by means of an electric machine solely, or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen.

The technology involved in electrically operated vehicles is closely related to the development of electrical energy storage systems, such as battery-related technology for vehicles. Today's electrical energy storage systems for vehicles may comprise a battery pack with a plurality of rechargeable battery cells which, together with control circuits, form a system which is configured for providing electric power to an electric machine in a vehicle.

A vehicle which is operated by means of an internal combustion engine and an electric machine supplied with power from a rechargeable electrical energy storage system is sometimes referred to as a plug-in hybrid electric vehicle (PHEV). A plug-in hybrid electric vehicle normally uses an energy storage system with rechargeable battery cells which can be charged through a connection to an external electric power supply. During charging, a high amount of energy is fed into the energy storage system in a relatively short time in order to optimize the vehicle's range of driving. For this reason, the actual charging of the energy storage system is suitably implemented through a process in which a control unit on the vehicle requests a charging process to be carried out by means of an external electric power supply. This is carried out after the energy storage system and the external power supply have been electrically connected by means of suitable connector elements.

In the field of automotive technology, an energy storage system normally comprises a battery pack with a large number of battery cells. Using a plug-in hybrid vehicle as an example, a battery pack may for example be of the lithium-ion type. In the event that a 600 V lithium-ion battery pack is used, approximately 200 battery cells connected in series will then be needed to achieve a desired voltage in order to operate the vehicle. The available range for driving the vehicle depends on certain parameters such as the state of charge (SoC) of the battery pack. The state of charge is an important parameter to use in order to prevent batteries from being operated during under- or over-charging situations, and to manage the energy in electric vehicles. The state of charge needs to be estimated since no direct measurement is available for this parameter.

Furthermore, it is known that batteries degrade over time, and there is a need for a diagnosis of any decrease in performance estimated by means of battery parameters, such as for example the cell terminal voltage, the cell capacity and the ohmic resistance of each cell. Such estimation could be carried out by means of a sensor arrangement configured for measuring one or more parameters which can consequently be used as an indication of the state of operation of the battery pack.

Generally, there is a desire to obtain optimum properties of a battery pack. It is previously known that requirements for optimum battery properties can be reached by means of a process referred to as battery cell equalization. The reason is that the voltages of different battery cells in a battery pack will differ between cells during the course of time. This lack of balance between cells may result in degraded battery properties and needs to be corrected.

Today, there exist several different methods for cell equalization. One such known method is to discharge a selected battery cell, which is found to have a cell voltage or state of charge (SoC) which differs considerably from the remaining battery cells, through a resistor which is coupled in parallel with the battery cell.

The patent document US 2013/278218 discloses a circuit for balancing a number of battery cells which comprises a plurality of resistors which are arranged in parallel with the battery cells and a plurality of switches configured in series with the resistors. A control circuit is configured to activate the switch based on the detected voltage of the battery cells. The operating life of the battery is also taken into account.

A disadvantage with this method is that it leads to a high amount of leak currents from the battery cells due to activation of the battery cell switches for which equalization is to be carried out. This leads to a degradation of the total efficiency of the battery pack.

Consequently, although there exists known systems for equalizing the cells of a battery pack, there is a problem in the form of a need to minimize leak currents from the battery pack. In this manner, the general performance of the battery pack could be optimized.

Consequently, it is desirable to provide an improved method and system for battery cell balancing which solve the problems associated with prior solutions and by means of which a lower level of leak currents and power losses from the battery pack will be obtained.

According to an aspect of the present invention, a method is provided for balancing a battery pack comprising a plurality of battery cells connected in series, wherein each battery cell is associated with a resistor which is connected in parallel with said battery cell and wherein each of said resistors is coupled in series with a controllable switch which is connected to a control unit. The method comprises: selectively closing and opening said switch so as to initiate discharging of the corresponding battery cell; thereby balancing said battery cell in relation to other cells of said battery pack. Furthermore, the method comprises the steps of: a) defining a control variable indicating, for each switch, an open or closed condition;

b) determining a cost based at least on the current losses of the battery pack resulting from said switch being controlled according to said control variable; c) repeating steps a) and b) a predefined number of times; d) selecting a control variable which results in said cost being minimized; and e) initiating said balancing based on the selected control variable.

By means of the invention, certain advantages are obtained. Primarily, it can be mentioned that an improved cell balancing process is obtained in which the power losses due to leak currents in the individual battery cells can be minimized. This leads to improved performance of the battery pack. The invention also allows a continuous cell balancing process with an increased useful energy capacity and increased battery system lifetime as compared with known systems. The process can furthermore be obtained by means of inexpensive hardware and software. For example, the above-mentioned switches only need to handle small currents and can therefore be small and inexpensive.

According to an embodiment, the method comprises determining said cost by executing and minimizing a cost function which defines a relationship between said current losses resulting from a given control variable and the state of balance of the battery pack. According to an embodiment, the method furthermore comprises a step of calculating, for each battery cell of said battery pack, a sum of the current losses and a value which is a function of a state of balance for the entire battery pack; and selecting the control variable based on a cell which said sum is the lowest of all the cells of said battery pack. In this manner, providing a low loss cell balancing process can be achieved.

According to further embodiments, the above-mentioned control variable can be defined in several ways (referring to step a) above). According to a preferred alternative, it is defined in a manner by using only those battery cells which present a relatively high state of charge, for example exceeding a predetermined threshold value. This limits the load on the hardware and software during the step of selecting a suitable control variable. Evaluating all possible combinations of leaking cells is not computational feasible. For example, for just 8 battery cells there are 256 possible combinations. The approach is consequently to simplify the problem by only leaking the cells with the highest SoC. The exact number of leaking cells is found by minimizing the previously described cost function.

According to another aspect of the present invention, a system is provided for balancing a battery pack comprising a plurality of battery cells connected in series, wherein each battery cell is associated with a resistor which is connected in parallel with said battery cell and wherein each of said resistors is coupled in series with a controllable switch which is connected to a control unit, said control unit being configured to selectively close and open said switch to initiate discharging of the corresponding battery cell, thereby balancing said battery cell in relation to other cells of said battery pack. Furthermore, the control unit is configured for a) defining a control variable indicating, for each switch, an open or closed condition; b) determining a cost based at least on the current losses of the battery pack resulting from said switch being controlled according to said control variable; c) repeating steps a) and b) a predefined number of times; d) selecting a control variable which results in said cost being minimized; and for e) initiating said balancing based on the selected control variable.

Further advantages and advantageous features of the invention are disclosed in the following description.

BRIEF DESCRIPTION OF THE DRAWINGS

With reference to the appended drawings, below follows a more detailed description of embodiments of the invention cited as examples.

DETAILED DESCRIPTION

Different aspects of the present disclosure will be described more fully hereinafter with reference to the enclosed drawings. The method and system disclosed herein can, however, be realized in many different forms and should not be construed as being limited to the aspects set forth herein.

Figure 1:
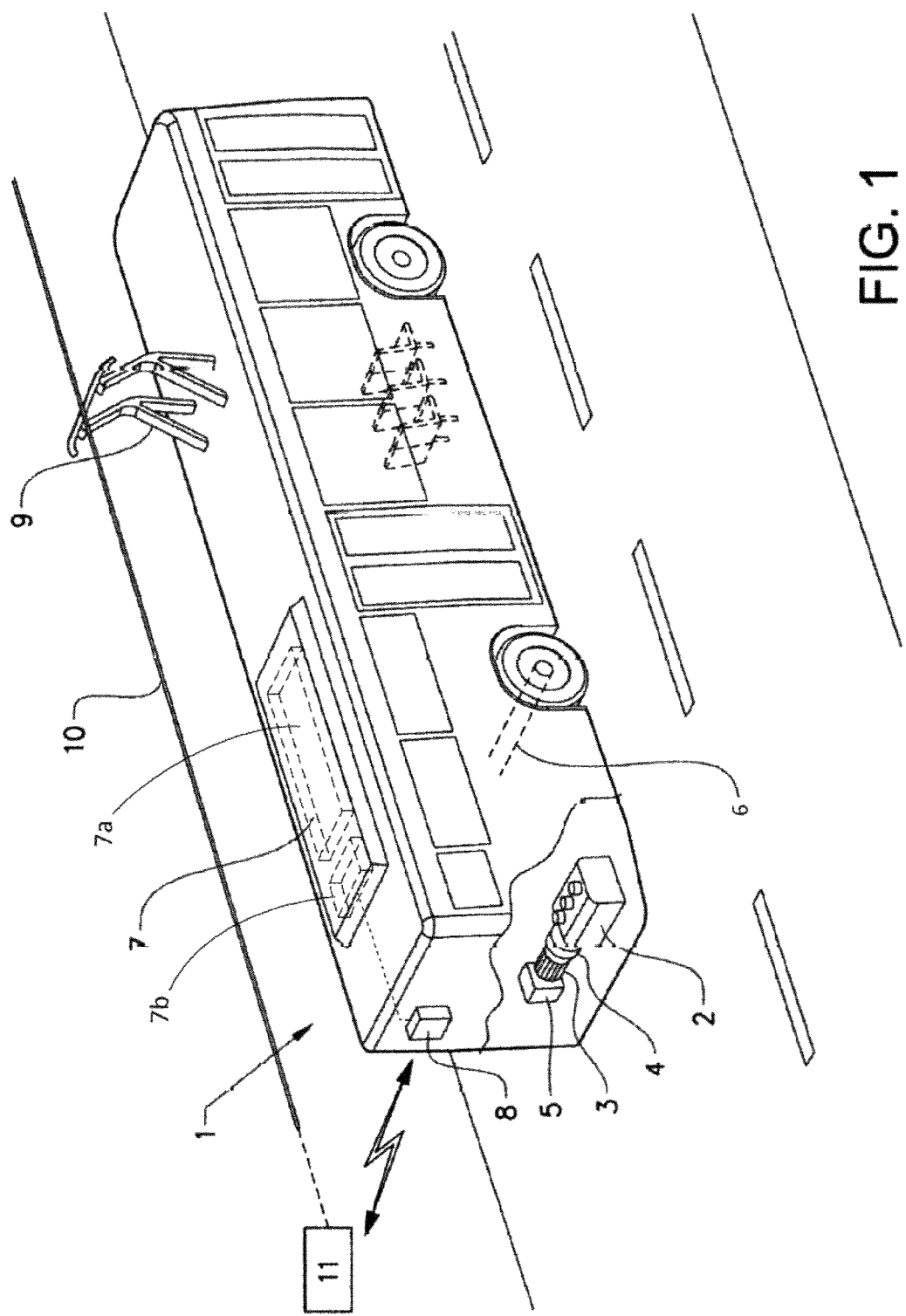
FIG. 1 shows a schematical view of a hybrid vehicle in the form of a bus, in which the present invention can be used.

With initial reference to FIG. 1, there is shown a simplified perspective view of a vehicle in the form of a bus 1 which according to the embodiment is of the so-called plug-in hybrid type which is equipped with an internal combustion engine 2 and an electric machine 3 which are connected to each other via a clutch 4. Both the internal combustion engine 2 and the electrical machine 2 can be used to drive the bus 1.

The electric machine 3 is connected to a gearbox 5, which in turn is connected to a rear axle 6 of the bus 1. In a manner which is known as such and therefore not described in detail, the internal combustion engine 2 and the electric machine 3 can be used for driving the rear axle 6. According to the embodiment, the electric machine 3 is used as a combined electric drive motor and generator, and is suitably also used as a starter motor for the internal combustion engine 2.

The bus 1 carries an electric energy storage system 7 which comprises a battery pack 7a which in turn comprises a plurality of battery cells (not shown in detail in FIG. 1). As will be described in greater detail below, the battery cells are connected in series to provide an output DC voltage having a desired voltage level. Suitably, the battery cells are of lithium-ion type, but other types may also be used.

The energy storage system 7 also comprises a sensor unit 7b which is arranged for measuring one or more predetermined parameters which are indicative of the state of operation of the battery pack 7a. For example, the sensor unit 7b can be configured for measuring the voltage of the battery pack 7a and the cell voltage of each battery cell. Furthermore, the sensor unit 7b can be configured for measuring an alternative parameter such as the battery current, i.e. the output current of the battery pack 7a, or the temperature of each battery cell or the entire battery pack 7a. As will be described in detail below, the parameter or parameters measured by means of the sensor unit 7b can be used for controlling the condition of the battery pack 7a.

According to an embodiment, the energy storage system 7 is arranged on the roof of the bus 1, as indicated in FIG. 1. The above-mentioned components of the propulsion system of the bus 1, including the energy storage system 7, are connected to a control unit 8 which is configured for controlling the electric energy storage system 7 and other relevant vehicle components.

Even though this disclosure refers to a battery pack 7a used in a vehicle 1 in the form of a bus, it relates generally to controlling the status of a battery pack—in particular for balancing the cells of a battery pack—in virtually any type of vehicle which is operated by means of at least an electric machine and which has an energy storage system comprising a battery pack with a number of battery cells.

During certain modes of operation of the bus 1, it is suitable to use the electric machine 3 for operating the bus 1. This means that the energy storage system 7 will deliver power to the electric machine 3, which in turn is driving the rear axle 6. During other modes of operation of the bus 1, for example when the state of charge of the energy storage system 7 is determined as not being sufficient for operating the bus 1 by means of the electric machine 3, the internal combustion engine 2 is connected, via the clutch 4 and the gearbox 5, to the rear axle 6. The manner in which an electric machine and an internal combustion engine can be combined and used for operating a vehicle is generally previously known and for this reason, it is not described in any greater detail here.

The bus 1 is equipped with a first electric connector element 9, suitably in the form of a pantograph, which is mounted on the roof of the bus 1 and which is arranged for being connected to a second electric connector element 10 in the form of an overhead electrical conductor wire which forms part of an external power supply 11 and is configured for conducting a charging current having a certain voltage. In this manner, the energy storage system 7 can be supplied with an electrical current, by means of the connection between the overhead wire 10 and the pantograph 9, in order to charge the battery pack 7a.

According to an embodiment, the pantograph 9 and the overhead wire 10 are arranged so that charging of the energy storage system 7 takes place while the bus 1 is standing still, i.e. either at a charging station at a bus terminal or at a bus stop or a similar position. It should be noted that other types of processes can be implemented for charging the electrical storage system 7 than shown in FIG. 1, for example using electric plugs feeding current from an external power supply and being connected into a corresponding socket arranged in the vehicle.

An embodiment of the invention will now be described in greater detail with reference to FIG. 2, which is a simplified schedule of the battery pack 7a and associated components of the vehicle 1. All components shown in FIG. 1 are not shown in FIG. 2.

As explained above, the battery pack 7a comprises a number of battery cells C1, C2, C3, . . . etc. (also referred to with reference numeral "C") which according to an embodiment is suitably in the magnitude of 200 cells, although the specific number may vary. According to an embodiment, the battery cells are of the lithium ion type, although the principles of the invention are equally applicable to other types of battery cells.

The battery pack 7a is connected to the electric machine 3 and is configured for operating said electric machine 3 (which in turn operates the vehicle 1). Furthermore, the battery pack 7a is connected to a sensor unit 7b, which in turn is connected to the control unit 8. According to the embodiment shown in FIG. 2, the sensor unit 7b is configured for monitoring the status of the battery pack 7a, i.e. for monitoring the status of each battery cell C. More precisely, the sensor unit 7b is configured for measuring one or more operating parameters for the battery pack 7a. According to an embodiment, such an operating parameter is the voltage U of each battery cell C. Consequently, the sensor unit 7b is configured for measuring the terminal voltage U for each battery cell C and for transmitting information related to the measured voltage values to the control unit 8. Using these voltage values, a state of charge (SoC) estimation module 8a which forms part of the control unit 8 can be used for determining the state of charge (SoC) of the battery pack 7a, i.e. the state of charge for each one of the battery cells C. Also, the sensor unit 7b is configured for measuring the current of the battery pack 7a.

As will be described in further detail below, the control unit 8 also comprises a cell balancing module 8b which is arranged for balancing the cells C of the battery pack 7a. In order to accomplish this, estimated values of the SoC of each cell C will be provided by the SoC estimation module 8a and used during the cell balancing process. According to the embodiment, measurements of the voltage of each cell C, the battery current I, and the resistance R of each cell C are also used during the actual cell balancing process.

Figure 2:
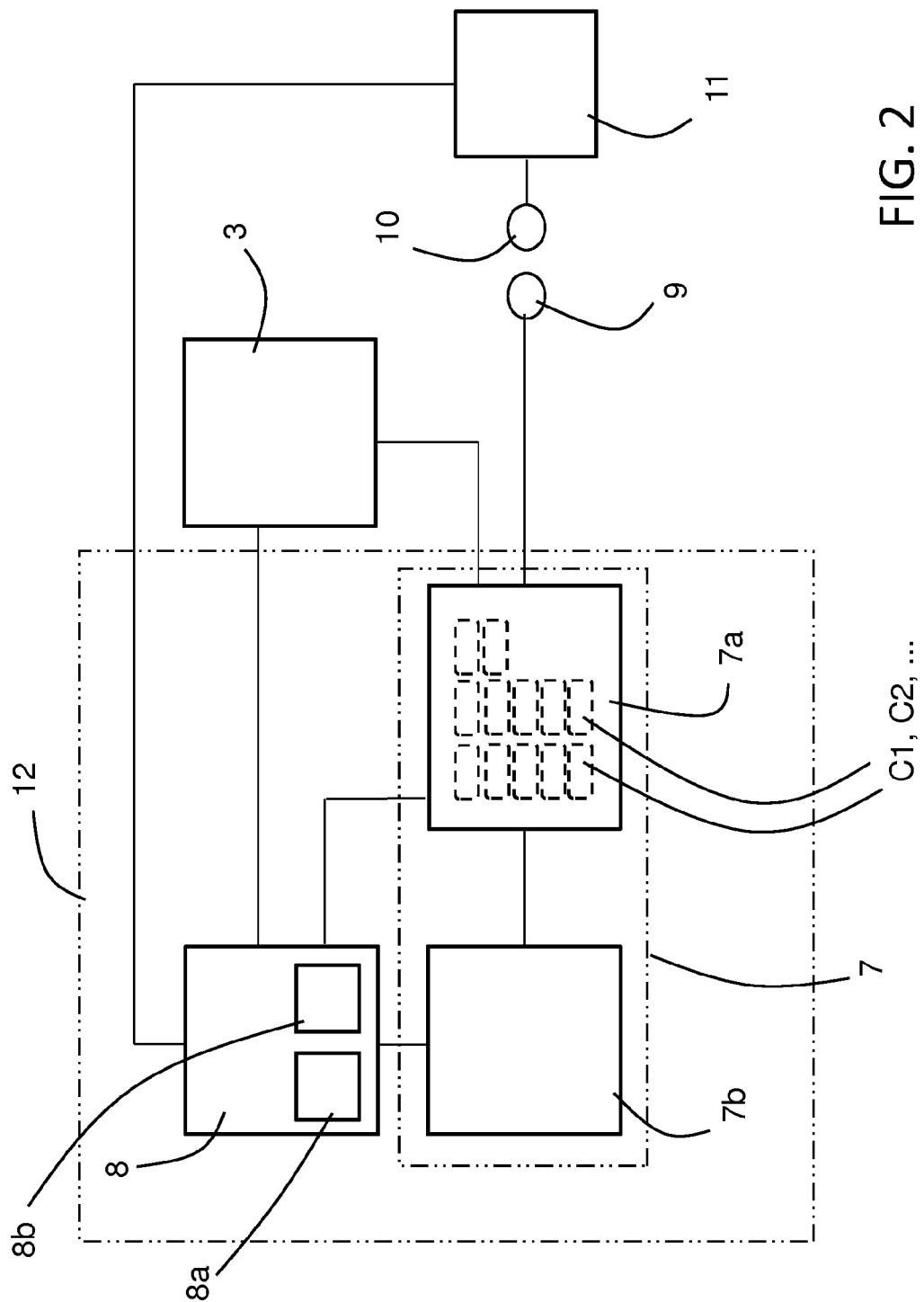
FIG. 2 is a schematic view of a battery management system for a vehicle, in accordance with an embodiment of the invention.

FIG. 2 also shows in a schematical manner the first connector 9, forming part of the vehicle, and the second connector 10, forming part of the external power supply 11. Consequently, the battery pack 7a, the sensor unit 7b and the control unit 8 together constitute a battery management system 12 which is arranged for monitoring the status of the battery cells C and for providing a cell balancing procedure.

As mentioned above, the status of the battery pack 7a and its battery cells C can be described with parameters such as its state of charge (SoC) and state of health (SoH). The state of charge (SoC) corresponds to the remaining amount of charge in the battery pack 7a and is for this reason estimated continuously. The state of health (SoH) can be monitored and estimated by measuring the cell capacity (Ah) of each battery cell C and also by measuring the ohmic resistance (ohms) of each battery cell C.

As will be described in greater detail below, the invention relates to a method for controlling a cell balancing process of the battery pack 7a. For this reason, there is shown in FIG. 3 a number of battery cells C1, C2, C3 forming part of the battery pack 7a and being configured for implementing a cell balancing process.

Figure 3:
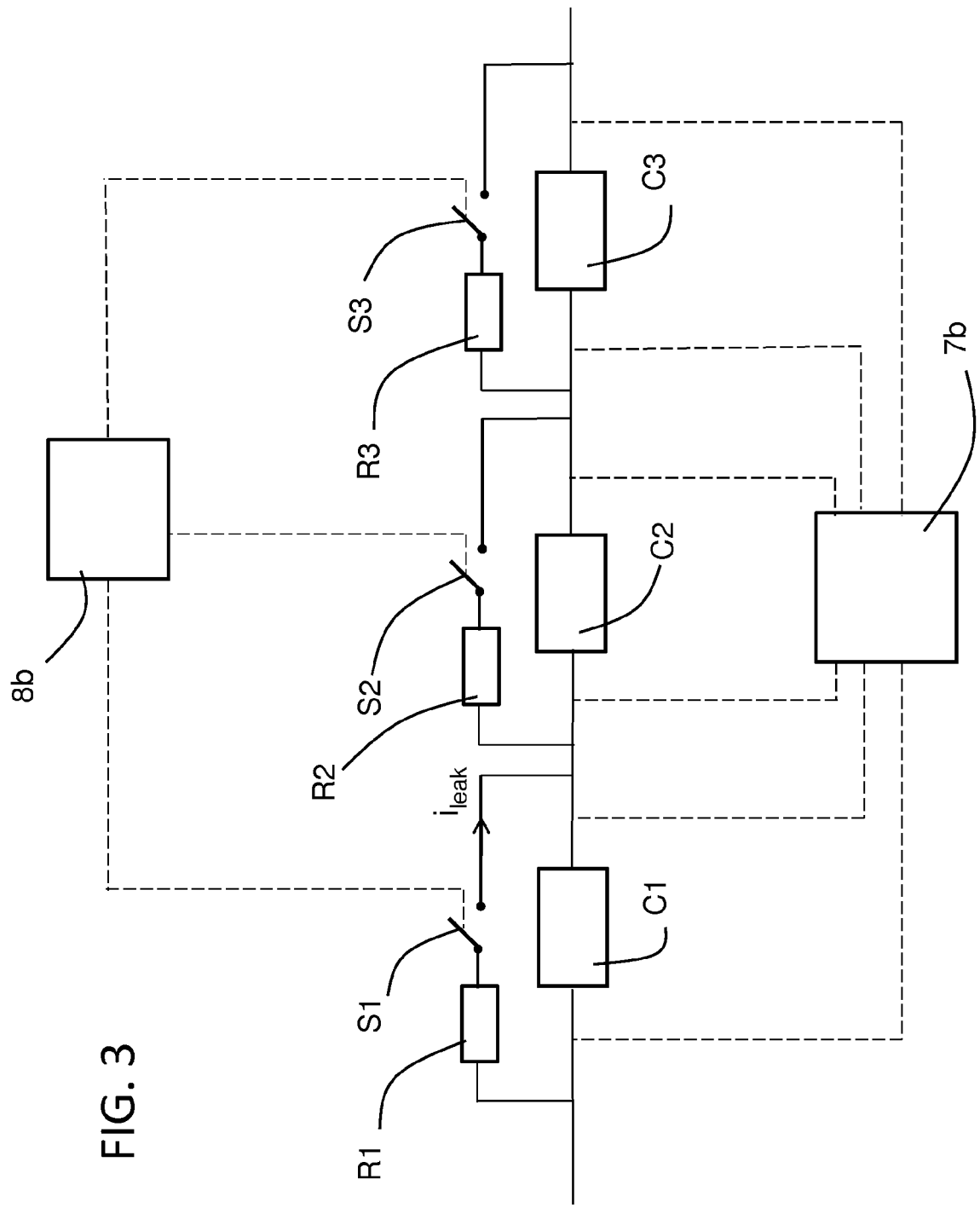
FIG. 3 is a schematic view of an exemplary embodiment disclosing a small number of battery cells being configured for cell balancing.

FIG. 3 discloses only three battery cells C1, C2, C3. However, it is obvious that a battery pack 7a to be used for example in a vehicle comprises a large number of cells, typically in the magnitude of 200 cells, and that all cells are designed in a similar manner as those shown in FIG. 3. For simplicity, however, FIG. 3 only shows three such battery cells C.

A first battery cell C1 shown in FIG. 3 is arranged with a resistor R1 coupled in parallel with the battery cell C1. The purpose of the resistor R1 is to allow an electric current to pass through said resistor R1 during a process of cell balancing. In order to accomplish this, the resistor R1 is coupled in series with a controllable switch S1. As indicated in FIG. 3, the switch S1 is connected to a cell balancing unit 8b which forms part of the control unit 8 (also indicated in FIG. 2). In this manner, the switch S1 can be set either in a closed state in which current may pass through the resistor R1, or in an open state in which no current may pass through the resistor R1. A leak current $i_{leak}$ is consequently generated in the event that the switch S1 is set in its closed state. For this reason, the resistor R1 can be referred to as a "leak resistor". As explained initially, during cell balancing, one or more suitable switches are closed in order to improving the total cell balance of the battery pack.

The remaining battery cells, i.e. the cells C2, C3 in FIG. 3 and also all the other cells of the battery pack 7a which are not shown as such in FIG. 3, are configured in the same manner as the described cell C1, i.e. with a circuit including a resistor and a controllable switch which is coupled in parallel with the associated battery cell. Consequently, each battery cell C may give rise to a leak current $i_{leak}$ in the event that a corresponding switch S is closed.

All the controllable switches S1, S2, S3 are connected to the cell balancing module 8b. Also, each switch S1, S2, S3 is set in its open or closed state depending on certain operating conditions relating to a cell balancing procedure, as will be described in detail below.

As mentioned above, there is a desire to arrange the sensor unit 7b (see also FIGS. 1 and 2) so as to provide a measurement of at least one parameter which reflects the state of operation of the battery pack 7a. According to an embodiment, there is provided a measurement of the voltage U of each battery cell C by means of said sensor unit 7b. For this reason, and as shown in FIG. 3, each battery cell C are connected to the sensor unit 7b in order to measure the voltage U of each cell C.

According to an embodiment, the battery management system 12 according to the invention may be configured for measuring other parameters than the battery voltage as indicators of the state of operation of the battery pack 7a. Purely as examples, such parameters can be the battery current I, the battery temperature T or the resistance R of each cell C. All these parameters can be used for controlling the status of the battery pack 7a and the cell balancing process.

According to this disclosure, there is proposed a method for cell balancing of the battery pack 7a. The main reason for implementing a cell balancing process is to improve the general level of performance and properties of the battery pack 7a. The principles of the cell balancing will now be described primarily with reference to FIG. 3.

As mentioned above, each cell C1-C3 of the battery pack 7a is associated with a resistor R1-R3 (as shown in FIG. 3) which is connected in parallel with the corresponding battery cell C1-C3. Also, each resistor R1-R3 is coupled in series with a controllable switch S1-S3 which is connected to the control unit 8. According to an embodiment, the cell balancing process is based on the principle that each switch S1-S3 can be closed or opened in order to discharge the corresponding battery cell C1-C3, i.e. so that a leak current ilk flows through the associated resistor R1, R2, R3 upon closing of the switch. By discharging a particular battery cell in this manner, said battery cell will be forced to change its state of charge (SoC). By balancing for example those cells which have considerably higher SoC than the remaining cells, or those cells which have a considerably higher cell voltage than the remaining cells, the entire battery pack 7a will be brought to a condition involving a higher level of cell balancing. As mentioned, this leads to an improved performance of the battery pack 7a.

The above described hardware including the cell balancing module 8b is configured for managing the leak current of all battery cells C which are involved in the cell balancing process. The leak current $i_{leak}$ only occurs when a corresponding switch S is in its closed position.

According to an embodiment, a specific cell balancing algorithm is used. The purpose of this algorithm is to select one or more specific battery cells for which leak currents should be generated. By controlling the leak currents in this manner, i.e. by controlling the closing and opening of the switches S1-S3, an optimal balance between the current losses resulting from the leak currents and the imbalance of the battery cells can be obtained. In other words, the approach according to an embodiment is to control the leak currents in such a way that an optimal balance between current losses and battery cell imbalance is found. The term "optimal balance" here refers to a situation in which the current losses resulting from one or more switches S being closed are minimized. According to a further embodiment, the sum of the total power losses resulting from one or more switches S being closed and the state of balance (SoB) of the battery pack 7a is minimized.

Figure 4:
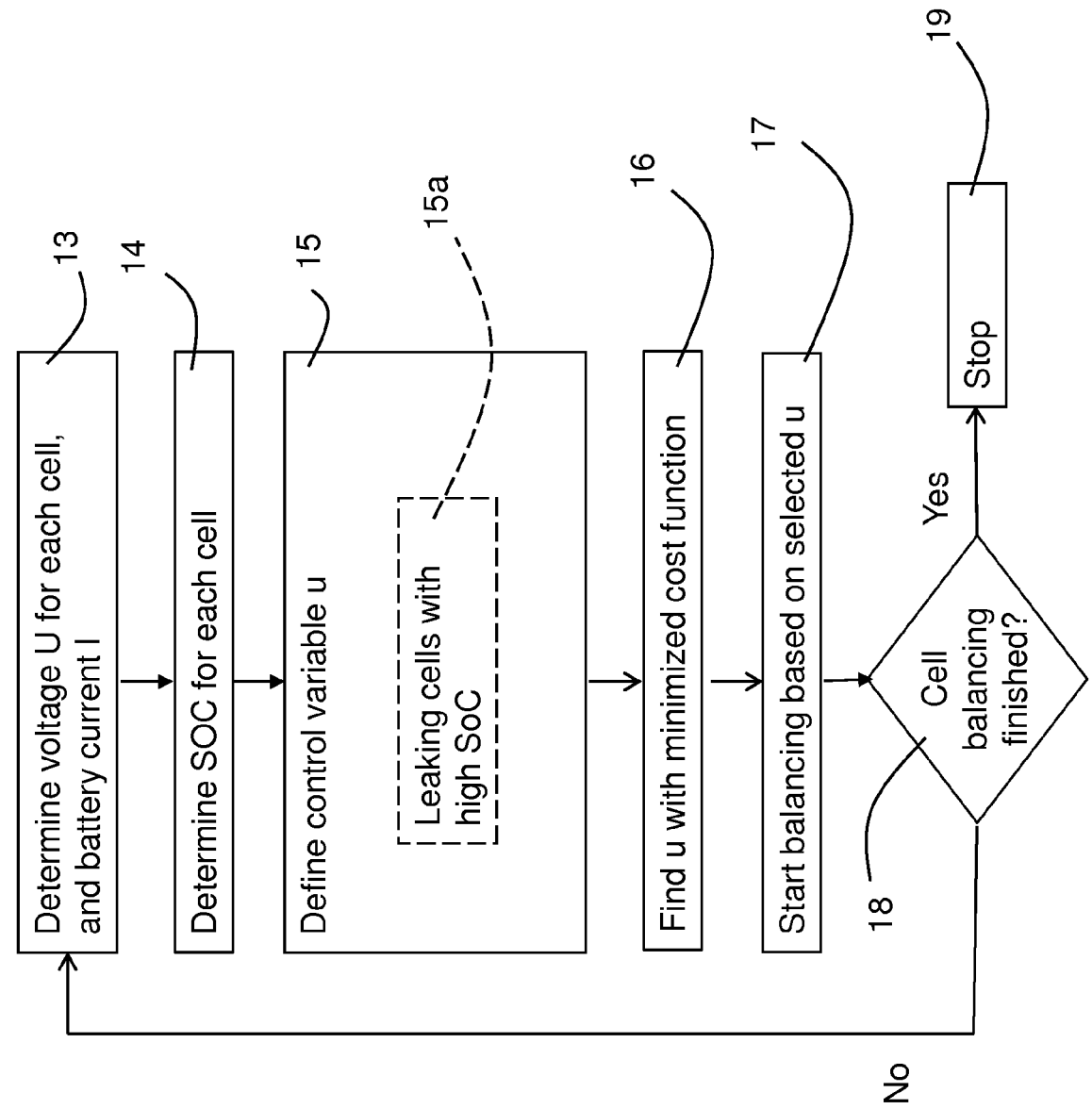
FIG. 4 is a flowchart illustrating the operation of an embodiment of the invention.

The above-mentioned algorithm will now be described primarily with reference to FIG. 4, which is a flowchart illustrating the cell balancing process. Initially, it is assumed that the voltage U across each battery cell C and the battery current I are measured by means of the sensor unit 7b, as indicated by means of reference numeral 13 in FIG. 4. In this manner, the state of charge SoC for each battery cell C can be determined (step 14 in FIG. 4).

The next step in the cell balancing process is to define a particular "cost function" (step 15), which corresponds to an assumed "cost" associated with the cell balancing process in the form of the total losses due to the leak currents being initiated. The cost function should be minimized in order to obtain a maximum efficiency for the cell balancing process. This corresponds to equation (1):

$$\min \text{cost}(u) \tag{1}$$

where the term u corresponds to a control variable in the form of a vector, more precisely a binary string with $N_{cells}$ bits, i.e. with the same number of bits as the total amount of battery cells. In the control variable u, a digit "1" corresponds to a closed switch in a first cell (which generates a leak current) whereas a digit "0" corresponds to an open switch in a further cell (which does not generate any leak current).

In the simplified example disclosed in FIG. 3, it is assumed that all the switches S1-S3 are open (as actually shown in FIG. 3), which would correspond to a control variable according to the following:

u=000

On the other hand, if it were assumed that a cell balancing process were to be initiated in which the second switch S2 were closed, the control variable would then be:

u=010

The above-mentioned embodiment is a very simple example and in real life, the number of battery cells is the order of 200, which means that the control variable could correspond to a high number of combinations.

Consequently, a control variable u is defined based on an assumption that one or more battery cells should be balanced (step 15) in order to obtain a higher level of balancing for the entire battery pack. Each element in the control variable u determines if the switch for a specific battery cell shall be on or off. This means that the control variable can be used by the cell balancing module 8b (see FIGS. 2 and 3) for defining the cells that shall be leaking current. In other words, the string is a "balancing instruction" vector which controls which one(-s) of the switches S that should be closed during cell balancing.

For a given control variable u, the above-mentioned cost function should be minimized. This cost function is defined according to equation (2):

$$\text{cost}(\overline{u}) = P_{losses} + \varepsilon(\text{SoB}(t+dt)) \quad (2)$$

wherein the power losses $P_{losses}$ can be described by means of equation (3):

$$P_{losses} = \sum_{i=1 \ldots N_{cells}} i_{Rb,i}^2 \cdot R_{b,i} \quad (3)$$

The power losses $P_{losses}$ correspond to the sum of losses from each cell resulting from a particular current $I_{Rb}$ flowing through a corresponding resistor $R_b$. Also, the cost function contains the term SoB, i.e. the state of balance, which defines how well balanced the battery cells are. The lower SoB value, the better the state of balance. This is defined in equation (4):

$$\text{SoB} = \max(\text{SoC}) - \min(\text{SoC}) \quad (4)$$

This means that the SoB is the difference between the highest and lowest SoC values for the battery cells.

The cost function also comprises a further term s which can be defined according to equation (5):

$$\varepsilon(\text{SoB}) = \begin{cases} 0 & (\text{SoB} \leq \text{SoB}_{tar}) \\ \left[(\text{SoB} - \text{SoB}_{tar}) \cdot \frac{P_{lossmax}^{\frac{1}{2}}}{\text{SoB}_{tar} \cdot (\alpha - 1)}\right]^2 & (\text{SoB} > \text{SoB}_{tar}) \end{cases} \quad (5)$$

Equation (5) contains the term $\text{SoB}_{tar}$, which is a threshold value. More precisely, if the SoB value is less than, or equal to, this threshold value $\text{SoB}_{tar}$, the term ε is zero. In such a situation, no leak currents are generated for balancing the battery pack. The actual value of $\text{SoB}_{tar}$ is suitably a few percent and is chosen in order to allow certain minor measurement errors and similar variations. Furthermore, the terms $P_{lossmax}$ and α are used to define how the term ε varies with SoB.

According to an embodiment, the cost function consequently describes a sum of the total power losses (resulting from the leak currents) and the term ε which depends on the state of balance (SoB). Furthermore, it is an important principle of said embodiment that a cell balancing process comprises a step of minimizing the cost function, i.e. first determining the sum of the current losses and the state of balance of the battery pack (7a), for a given control variable, and then selecting the control variable which leads to the minimized cost function (see step 16 in FIG. 4). This particular control variable is then used during a cell balancing process (step 17), i.e. the bit string which forms part of the control variable u is used by the cell balancing module 8b during a cell balancing process for controlling which switch(-es) of the battery cells should be closed and open.

The process of balancing the battery pack is based on a selected control variable, meaning that a given leak current will be generated for a predetermined period of time. After this time, it is checked whether a sufficient SoB is reached and the cell balancing can be finished (step 18). If not, the process it repeated in a manner in which a new control variable is selected which fulfills the requirement of minimizing the above-mentioned cost function. If the SoB target is reached, the cell balancing process is terminated (step 19).

It should be noted that the number of combinations of the control variable is $2^{Ncells}$. For batteries with a large number of battery cells, for example 200 cells, the number $2^{Ncells}$ is very high. In such case, there is consequently a very high number of combinations of switch settings to evaluate by the cell balancing module 8a before a suitable combination of settings, i.e. corresponding to a suitable control variable u, can be selected. This puts high demands on the hardware and software being used. For this reason, and according to further embodiments, the step of finding a control variable u with a minimized cost function (step 16 in FIG. 4) can be carried out in several slightly simplified ways. A preferred solution will be described below.

The preferred solution is to choose a number of control variables having a bit string where only those cells with a SoC which is relatively high can be selected (step 15a).

Figure 5:
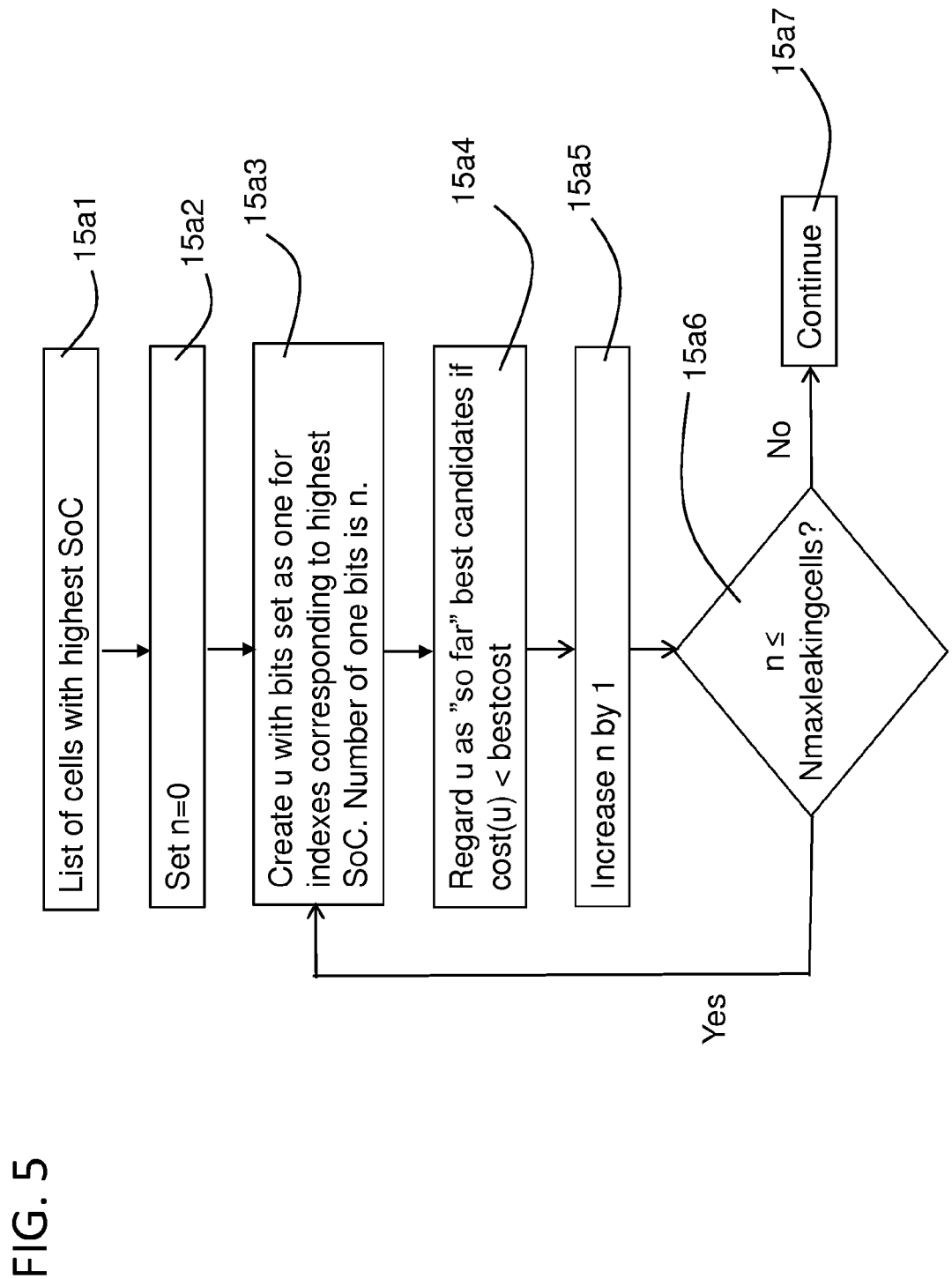
FIG. 5 is a flowchart illustrating an alternative of an embodiment.

This preferred solution comprises a first step of sorting the battery cells according to the SoC of each cell. This means that there is provided a list which defines which cell has the highest SoC, which cell has the second highest SoC, which cell has the third highest SoC, and so on. This step is referred to as 15a1 in FIG. 5.

Next, a counter n is set to zero (step 15a2). After this, the control variable u is defined, and the above-mentioned cost function is determined, for a case in which no battery cell at all is activated for leaking. This corresponds to a choice of n=0 (see step 15a3). At this stage, it is determined whether the cost function is less than a pre-determined value which is referred to as "bestcost" (see step 15a4).

After this, the counter is increased by 1 (see step 15a5) and the cost function is evaluated for a cell combination and a control variable indicating that the two cells having the highest SoC (i.e. n=2) can be activated for leaking.

As long as the number of cells intended for leaking is less than a predetermined maximum value $N_{maxleakingcells}$, the process will be repeated by returning to step 15a3 and by choosing a new corresponding control variable with a number of cells with the highest SoC and wherein the number of cells corresponds to the above-mentioned variable n.

When the maximum value $N_{maxleakingcells}$ is reached and the cost function has been evaluated for control variables from n=0 to n=$N_{maxleakingcells}$, the cost function is evaluated. When the term $N_{maxleakingcells}$ has been reached, the system reaches a stage (step 15a7) in which the control variable (having a certain number n of battery cells intended for leaking) for which the cost function is minimized is chosen as the control variable to be used in order to initiate the cell balancing procedure.

This process limits the number of battery cells for which the corresponding switches can be set in a closed position. This also means that the number of potential combinations for the bit string of the control variable u is greatly decreased, i.e. the battery cells which are relevant for leaking are only the ones having a relatively high SoC level. This simplifies the step of defining the control variable u.

The term ε according to the following:

$$\varepsilon(\text{SoB}(t+dt))$$

in equation (2) can be regarded as a soft constraint. If SoB<$\text{SoB}_{tar}$, wherein the term $\text{SoB}_{tar}$ corresponds to a threshold value, i.e. a desired level of balance in the battery pack, the optimal control is to open all switches, i.e. meaning that no leak currents are generated.

If SOB>$SOB_{tar}$, the leak currents are introduced in order to decrease SOB. The principles described above and with reference to FIG. 4 then apply. It is important only to close a minimum number of switches in the battery pack in order to minimize the total amount of losses due to the leak currents. One could here speak of a "balance cost" (i.e. a cost for obtaining a certain balancing status)

If SOB>>$SOB_{tar}$, the term e will be much larger than the $P_{losses}$ factor in equation (2). The consequence is that all efforts will be made to balance the cells to a high degree.

It is to be understood that the present invention is not limited to the embodiments described above and illustrated in the drawings; rather, the skilled person will recognize that many changes and modifications may be made within the scope of the appended claims.

The invention claimed is:

1. A method for balancing a battery pack comprising a plurality of battery cells connected in series, wherein each battery cell is associated with a resistor which is connected in parallel with the battery cell and wherein each of the resistors is coupled in series with a controllable switch which is connected to a control unit, the method comprising:
   selectively closing and opening the switch so as to initiate discharging of the corresponding battery cell;
   thereby balancing the battery cell in relation to other cells of the battery pack,
   the
   a) defining a control variable indicating, for each switch, an open or closed condition;
   b) determining a cost based at least on the current losses of the battery pack resulting from the switch being controlled according to the control variable;
   c) repeating steps a) and b) a predefined number of times;
   d) selecting a control variable which results in the cost being minimized; and
   e) initiating the balancing based on the selected control variable.

2. Method according to claim 1, further comprising:
   determining the cost by executing and minimizing a cost function which defines a relationship between the current losses resulting from a given control variable and the state of balance of the battery pack.

3. Method according to claim 1, further comprising:
   calculating, for each battery cell of the battery pack, a sum of the current losses and a value which is a function of a the state of balance for the entire battery pack; and
   selecting the control variable based on a cell which the sum is the lowest of all the cells of the battery pack.

4. Method according to claim 1, further comprising:
   calculating the state of balance based on the difference between the cell of the battery pack which has the highest state of charge and the cell of the battery pack which has the lowest state of charge.

5. Method according to claim 1, further comprising:
   defining the control variable in the form of a binary vector, each bit of which indicates the state of a corresponding switch in the battery pack.

6. Method according to claim 1, further comprising:
   defining (15a), in the step a), the control variable by using only those battery cells which present a relatively high state of charge (SoC).

7. A system for balancing a battery pack comprising a plurality of battery cells connected in series, wherein each battery cell is associated with a resistor which is connected in parallel with the battery cell and wherein each of the resistors is coupled in series with a controllable switch which is connected to a control unit, the control unit being configured to selectively close and open the switch to initiate discharging of the corresponding battery cell, thereby balancing the battery cell in relation to other cells of the battery pack, wherein the control unit is configured for a) defining a control variable indicating, for each switch, an open or closed condition; b) determining a cost based at least on the current losses of the battery pack resulting from the switch being controlled according to the control variable; c) repeating steps a) and b) a predefined number of times; d) selecting a control variable which results in the cost being minimized; and for e) initiating the balancing based on the selected control variable.

8. System according to claim 7, wherein the control unit is configured for executing and minimizing a cost function which defines a relationship between the current losses of the selected cell and the state of balance of the battery pack.

9. System according to claim 7, wherein the control unit comprises a cell balancing module which is configured for calculating, for each battery cell of the battery pack, a sum of the current losses and a value which is a function of a resulting state of balance for the entire battery pack; and for selecting the cell where its associated switch should be closed and for which the sum is the lowest of all the cells of the battery pack.

10. A vehicle comprising a system for balancing a battery pack according to claim 7.

11. A computer comprising a computer program for performing the method steps of claim 1 when the program is run on the computer.

12. A non-transitory computer readable medium carrying a computer program for performing the steps of claim 1 when the program is run on a computer.

13. A control unit for balancing a battery pack and being configured to perform the steps of the method according to claim 1.

* * * * *